(12) United States Patent
Ohtani et al.

(10) Patent No.: US 7,765,879 B2
(45) Date of Patent: Aug. 3, 2010

(54) FLOW CONTROL VALVE FOR MEASURING FLOW COEFFICIENT AND FLOW RATE

(75) Inventors: Hideo Ohtani, Tokyo (JP); Motohiro Furuya, Tokyo (JP)

(73) Assignee: Yamatake Corporation, Tokyo (JP)

( * ) Notice: Subject to any disclaimer, the term of this patent is extended or adjusted under 35 U.S.C. 154(b) by 151 days.

(21) Appl. No.: 12/266,676

(22) Filed: Nov. 7, 2008

(65) Prior Publication Data
US 2009/0120207 A1 May 14, 2009

(30) Foreign Application Priority Data
Nov. 9, 2007 (JP) .............................. 2007-292410

(51) Int. Cl.
*G01F 1/34* (2006.01)
*F16K 5/00* (2006.01)
(52) U.S. Cl. .................................... 73/861.42; 251/304
(58) Field of Classification Search ........................ None
See application file for complete search history.

(56) References Cited
U.S. PATENT DOCUMENTS
4,926,903 A * 5/1990 Kawai ........................ 137/554

2009/0120515 A1 * 5/2009 Ohtani et al. ............... 137/553

FOREIGN PATENT DOCUMENTS

| JP | 60-168974 A | 9/1985 |
|---|---|---|
| JP | 01-135983 A | 5/1989 |
| JP | 04-232514 A | 8/1992 |
| JP | 07-103945 B | 11/1995 |
| JP | 2772159 B | 7/1998 |
| JP | 2002-257246 A | 9/2002 |

* cited by examiner

*Primary Examiner*—Harshad Patel
(74) *Attorney, Agent, or Firm*—McDermott Will & Emery LLP

(57) ABSTRACT

A flow control valve has upstream fluid pressure outlets provided between inner and outer circumferential surfaces of an upstream retainer, which is attached to an upstream inner surface of a valve body. A second conduit is provided between inner and outer surfaces of the valve body on the upstream side of the valve body. First conduits are formed between the valve body and the upstream retainer. Downstream side fluid pressure outlets are provided between inner and outer surfaces of a downstream retainer, which is mounted to the inner surface of the valve body. A fourth conduit is provided between the inner and outer surfaces of the valve body on the downstream side of the valve body. Third conduits are formed between the valve body and the downstream retainer. A differential pressure sensor is attached to the outer surface of the valve body and to the second and fourth conduits.

2 Claims, 3 Drawing Sheets

FLOW CONTROL VALVE FOR MEASURING FLOW COEFFICIENT AND FLOW RATE

CROSS REFERENCE TO RELATED APPLICATION

This application claims the benefit under 35 U.S.C. §119 of Japanese Patent Application No. 2007-292410, filed on Nov. 9, 2007, which is hereby incorporated by reference herein in its entirety.

FIELD OF THE INVENTION

The present invention relates to a flow control valve that controls the flow rate of a fluid that flows inside a valve body, and more particularly relates to a flow control valve that measures the flow coefficient and the flow rate of the fluid.

BACKGROUND OF THE INVENTION

A flow rate Q of a fluid that flows inside a passageway of a flow control valve can be derived by measuring the differential pressure of the fluid between the primary side (upstream side) passageway and the secondary side (downstream side) passageway, the valve opening degree, and the flow coefficient (Cv value), and then plugging those values into equation [1] below.

$$Q = A \cdot Cv \cdot \sqrt{\Delta P} \quad [1]$$

Therein, A is the cross sectional area of a throttle part of the valve, and $\Delta P$ is the pressure differential of the fluid between the upstream side and the downstream side.

The control valves disclosed in, for example, in Japanese Examined Patent No. 2772159, Japanese Unexamined Patent Application Publication No., S60-168974, Japanese Examined Patent Application No. H07-103945 (Patent Documents 1-3, respectively) are known examples of flow control valves that are capable of measuring the flow coefficient and the flow rate of a fluid that flows inside a passageway.

In an integrated process control valve disclosed by Patent Document 1, a first pressure sensor that measures an inlet fluid pressure P1 is disposed at a portion of a passageway on an inlet side of a valve body, and a second pressure sensor that measures a fluid pressure P0 is disposed at a portion of a passageway on an exit side; in addition, a controller derives a differential pressure $\Delta P$ between the fluid pressures P1, P0, reads the flow coefficient (Cv value) of the valve from a table, and calculates the flow rate Q by $Q = kCv\sqrt{\Delta P/Gf}$, wherein k is a constant and Gf is the specific gravity of the fluid.

The flow control valve disclosed by Patent Document 2 comprises: a valve opening degree detecting means, which detects the valve opening degree; a first pressure detecting means, which detects the fluid pressure inside the upstream pipeline of the valve body; a second pressure detecting means, which detects the fluid pressure inside the downstream pipeline of the valve body; and an electrical means, which calculates, based on the electrical output signals of the first and second pressure detecting means and the valve opening degree detecting means, the fluid flow rate that flows inside the pipeline.

A butterfly valve, which comprises the flow rate measuring apparatus disclosed by Patent Document 3, is configured so that pressure outlet ports are formed at four locations on both the upstream side and the downstream side, and the differential pressure before and after the valve is measured by averaging the pressures sampled inside annular shaped cavities that extend in the circumferential directions and are formed on both the upstream and downstream sides of the inner circumference of a seat ring.

Incidentally, turbulent flow occurs before and after the throttle part of the valve, resulting in large pressure fluctuations; therefore, to measure the flow rate Q of the fluid with high accuracy, the upstream side fluid pressure outlet part and the downstream side fluid pressure outlet part must be provided at positions sufficiently spaced apart from the throttle part of the valve.

Furthermore, if the aim is to reduce the size of the flow control valve that is provided with a flow rate measuring means, then it is usually advantageous to dispose the flow rate measuring means inside an actuator that drives the valve element. Consequently, the control valve recited in the abovementioned Patent Document 1 features separate external piping that connects a controller part, which is provided with the flow rate measuring means, with an upstream side fluid pressure outlet part and a downstream side fluid pressure outlet part and thereby guides the fluid pressure to the controller.

Nevertheless, using piping to guide the fluid pressure from the upstream side fluid pressure outlet part and the downstream side fluid pressure outlet part to the controller in the control valves as disclosed by Patent Documents 1 and 2 poses some problems, including leakage of fluid from the joints of the piping that surround the valve body, an increase in the number of parts and the labor needed to assemble the piping, and a corresponding increase in cost.

In addition, the reduction in size of the butterfly valve recited in the abovementioned Patent Document 3 comes at the sacrifice of measurement accuracy. Namely, because the positions of the pressure outlet parts on the upstream and downstream sides are not sufficiently spaced apart from the valve element, the upstream side and downstream side pressures fluctuate greatly, leading to the problem wherein the flow rate cannot be measured with high accuracy.

SUMMARY OF THE INVENTION

The present invention was conceived to solve the problems with the conventional art described above, and it is an object of the present invention to provide a compact flow control valve that does not necessitate the provision of piping external to the valve body.

To achieve the abovementioned object, the present invention provides a flow control valve, comprising: a valve element that is provided and pivotally disposed inside a valve body and that regulates the flow rate of a fluid that passes through the interior of the valve body; an upstream side seat ring that contacts under pressure a seat part of the valve element; an upstream side retainer that holds the upstream side seat ring; a valve opening degree detecting means that detects the valve opening degree of the valve element; a differential pressure detecting means that detects the differential pressure between the fluid pressure inside an upstream side pipeline and the fluid pressure inside a downstream side pipeline of the valve body; and a flow rate calculating means that derives a flow coefficient based on a measurement value of the differential pressure detecting means and a measurement value of the valve opening degree detecting means, and calculates the flow rate of the fluid based on the measurement values and the flow coefficient; wherein, the differential pressure detecting means is attached to an outer circumferential surface of the valve body; an upstream side fluid pressure outlet part is provided between an outer circumferential surface and the inner circumferential surface of the upstream side retainer in the vicinity of the upstream side end part so that it passes therethrough; a first conduit, whose upstream side end communicates with the upstream side fluid pressure outlet part, is formed between the inner circumferential surface of the valve body and the outer circumferential surface of the upstream side retainer; and a second conduit, which connects a downstream side end of the first conduit and the differential pressure detecting means, is formed in the valve body.

A preferred embodiment of the present invention provides a flow control valve further comprising: a downstream side seat ring that contacts under pressure a seat part of the valve element; and a downstream side retainer that holds the downstream side seat ring; wherein, a downstream side pressure outlet part is provided between the outer circumferential surface and the inner circumferential surface of the downstream side retainer in the vicinity of the downstream side end part so that it passes therethrough; a downstream side fluid pressure outlet part is provided between the inner circumferential surface of the valve body, the downstream side end part of the downstream side retainer, and the inner circumferential surface of the valve body; a third conduit, whose downstream side end part communicates with the downstream side fluid pressure outlet part, is formed between the inner circumferential surface of the valve body and the outer circumferential surface of the downstream side retainer; and a fourth conduit, which connects an upstream side end part of the third conduit and the differential pressure detecting means, is formed in the valve body.

In the preferred embodiment of the present invention, the first conduit is provided between the inner circumferential surface of the valve body and the outer circumferential surface of the upstream side retainer, and the second conduit is provided inside the valve body; furthermore, the upstream side fluid pressure outlet part and the differential pressure detecting means are connected via these conduits; therefore, it is not necessary to provide passageway piping outside of the valve body for guiding the upstream side fluid pressure to the differential pressure detecting means, which makes it possible to make the flow control valve more compact. In addition, because the first conduit is formed between the upstream side retainer and the inner circumferential surface of the valve body, there is no need to incorporate separate parts, which simplifies manufacturing.

In addition, the upstream side fluid pressure outlet part is provided to the upstream side retainer in the vicinity of the upstream side end part and therefore can be sufficiently spaced apart from the valve element (i.e., by the length of the retainer in the pipe axial directions); further, the upstream side fluid pressure can be set high and, as a result, the differential pressure between the upstream side fluid pressure and the downstream side fluid pressure can increase, making it possible to measure the flow rate with high accuracy.

Furthermore, the third conduit is provided between the inner circumferential surface of the valve body and the outer circumferential surface of the downstream side retainer, and the fourth conduit is provided inside the valve body; furthermore, the downstream side fluid pressure outlet part and the differential pressure detecting means are connected via these conduits; therefore, it is not necessary to provide passageway piping outside of the valve body for guiding the downstream side fluid pressure to the differential pressure detecting means, which makes it possible to make the flow control valve even more compact. In addition, because the third conduit is formed between the downstream side retainer and the inner circumferential surface of the valve body, there is no need to incorporate separate parts, which simplifies manufacturing.

BRIEF DESCRIPTION OF THE DRAWINGS

The invention will become more readily apparent from the Detailed Description of the Invention, which proceeds with reference to the drawings, in which.

DETAILED DESCRIPTION OF THE PREFERRED EMBODIMENTS

Figure 1:
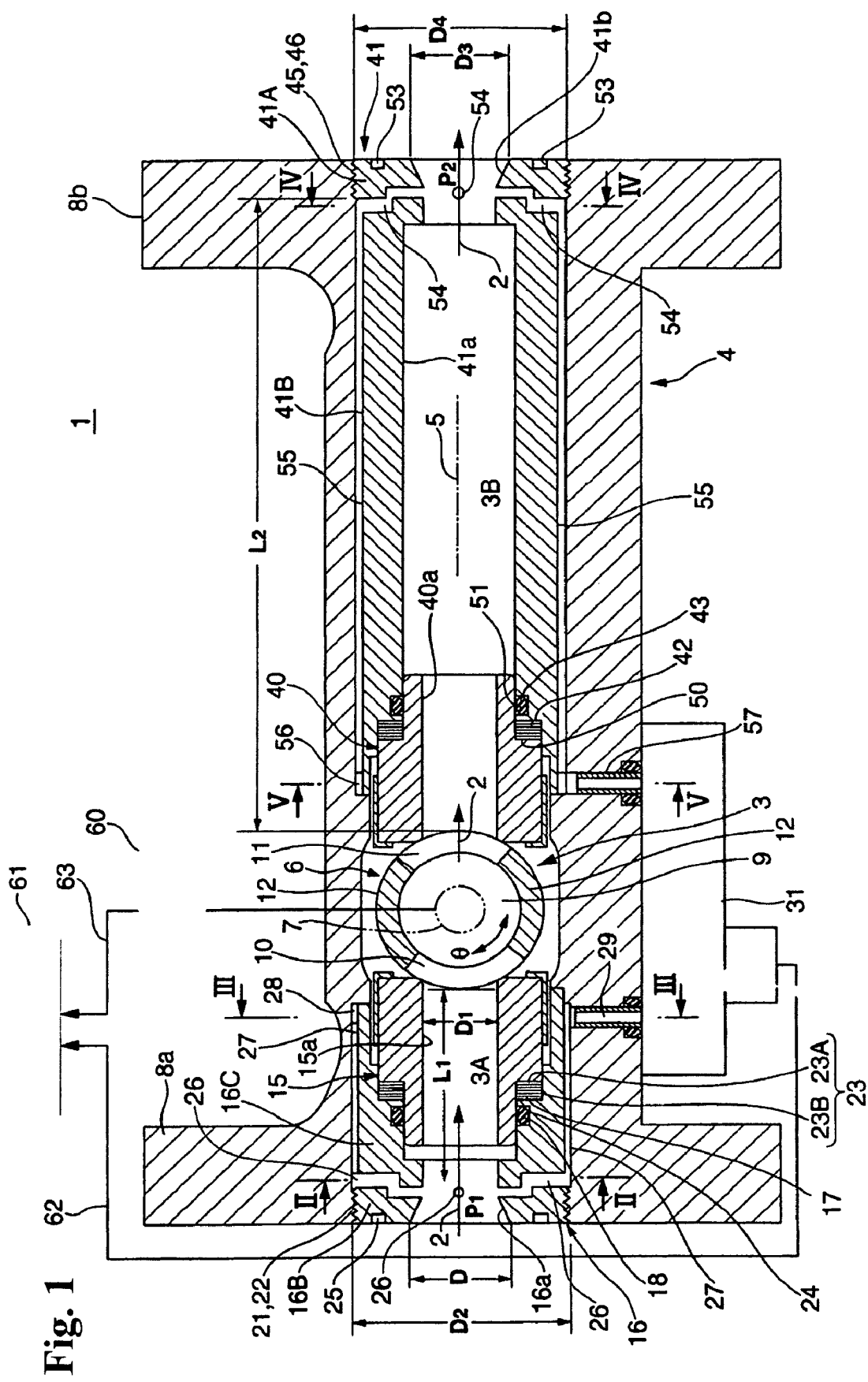
FIG. 1 provides a transverse cross sectional view that shows one embodiment of a flow control valve according to the present invention, wherein the flow control valve is fully open.
Figure 2:
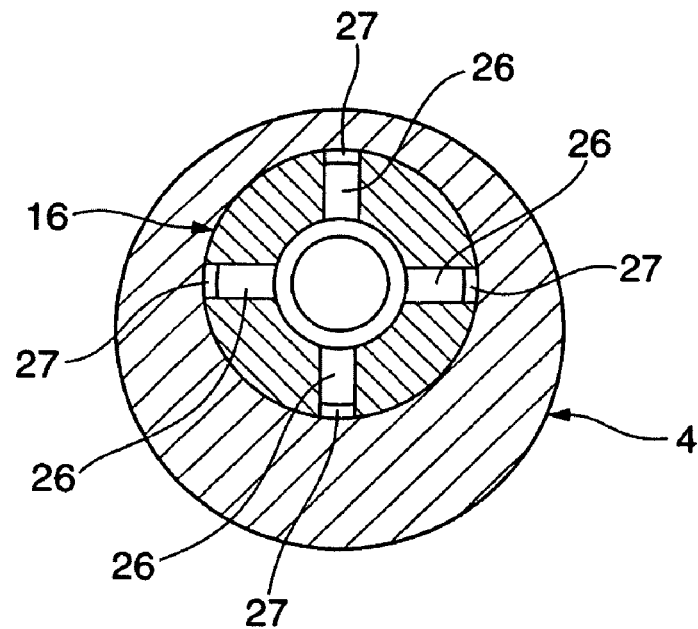
FIG. 2 is a cross sectional view taken along the II-II line of FIG. 1.

A listing of some of the reference numerals and letters that are used in the drawings, together with descriptions of the corresponding elements, is provided below:

1 Flow control valve
2 Fluid
3 Fluid passageway
3A Upstream side pipeline
3B Downstream side pipeline
4 Valve body
6 Valve element
15 Upstream side seat ring
16 Upstream side retainer
26 Upstream side fluid pressure outlet part
27 First conduit
28 Annular groove
29 Second conduit
31 Differential pressure sensor
30 40 Downstream side seat ring
41 Downstream side retainer
54 Downstream side fluid pressure outlet part
55 Third conduit
35 56 Annular groove
57 Fourth conduit
60 Valve opening degree detecting means
61 Flow rate calculating means The following description details the present invention based on embodiments shown in the drawings.

An embodiment of the present invention is adapted to a flow control valve comprising a floating type two-way ball valve that pivotally supports a valve element (ball plug) with a pair of seat rings disposed on the valve element's upstream and downstream sides. A floating type valve is a valve that achieves a seal principally by bringing the valve element and a downstream side seat ring into contact using upstream side fluid pressure to press the valve element against the downstream side seat ring when the valve element is fully open.

In FIG. 1, the floating type flow control valve, the entirety of which is represented by a reference symbol 1, comprises: a valve body 4, wherein a passageway 3 for a fluid 2 is formed internally; a ball shape valve element 6, which opens and closes the passageway 3 and is provided and disposed so that it pivots within a horizontal plane inside the valve body 4; and a valve stem 7, which rotatably operates the valve element 6 from outside the valve body 4.

Flange parts 8a, 8b, which constitute connecting parts that connect with piping, each comprises a straight pipe and is integrally and projectively provided to the outer circumferential surface of the valve body 4 at opposite end parts thereof; furthermore, a through hole (not shown), wherethrough the valve stem 7 passes so that it is freely pivotable, is formed in the center of the upper surface of the valve body 4. The passageway 3 inside the valve body 4 is partitioned by the valve element 6.

The valve element 6 comprises a substantially ball shaped hollow body wherein a through passageway 9 is formed, and its circumferential wall has an inflow side opening 10 and an outflow side opening 11 that together constitute a throttle part. The inflow side opening 10 and the outflow side opening 11 of the through passageway 9 are formed in the circumferential wall of the valve element 6 spaced apart by 180° in the rotational directions (arrow θ directions). The outer circumferential surface of the valve element 6 forms a spherical surface shaped seat part 12.

The valve stem 7 is configured so that its lower end part is coupled to the center of the upper surface of the valve element 6, its upper end part projects upward from the valve body 4, and so that driven by an actuator (not shown) it pivots the valve element 6 within an angular range of substantially 90° in the arrow θ directions.

Provided and disposed on the upstream side of the valve element 6 inside the valve body 4 are an upstream side seat ring 15, which tightly contacts the seat part 12 of the valve element 6; an upstream side retainer 16, which holds the upstream side seat ring 15 so that it is freely movable in the axial directions; a spring 17, which serves as an elastic member that presses the upstream side seat ring 15 against the valve element 6; and an O-ring 18, which seals the upstream side seat ring 15 to the upstream side retainer 16; together these elements constitute a seal structure of an upstream side seat ring part.

The upstream side seat ring 15 is formed as a tubular body that is open at both ends and thereby has a center hole 15a; furthermore, an upstream side passageway 3A of the passageway 3 is formed by this center hole 15a and an upstream side opening 16a of the upstream side retainer 16. The center hole 15a has a hole diameter D1, which is slightly smaller than an inner diameter D of the upstream side opening 16a. An upstream side end part of the upstream side seat ring 15 is formed with a thin wall and constitutes a small diameter part. Moreover, a downstream side end part is formed with a thick wall and constitutes a large diameter part, which is pressed against the seat part 12 of the valve element 6 by the spring 17.

The upstream side retainer 16 is formed as a tubular body that is likewise open at both ends and houses the upstream side seat ring 15 so that it is freely movable in the axial directions; furthermore, a male thread 21 is formed in the outer circumferential surface of an upstream side end part 16B, which can be screwed into a female thread 22 formed in the inner circumferential surface of the valve body 4 at the upstream side opening 16a. In addition, the upstream side opening 16a forms a tapered hole, the diameter of which decreases from the inner diameter D of an opening end surface toward the downstream side; the inner diameter of its minimum diameter part is equal to the hole diameter D1 of the upstream side seat ring 15. In addition, an annular shaped housing part 23, which houses the spring 17, is formed between the inner circumferential surface of the upstream side retainer 16 and the outer circumferential surface of the upstream side seat ring 15. The housing part 23 comprises a step part 23A, which is formed in the outer circumferential surface of the upstream side seat ring 15, and a step part 23B, which is formed in the inner circumferential surface of the upstream side retainer 16. Furthermore, an annular shaped groove 24, to which the O-ring 18 is fitted, is formed in the inner circumferential surface of the upstream side retainer 16.

Figure 3:
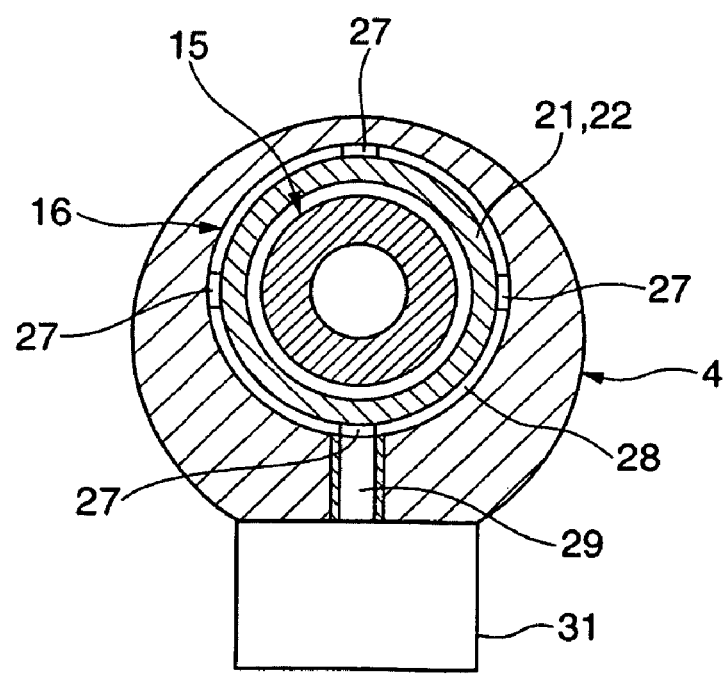
FIG. 3 is a cross sectional view taken along the III-III line of FIG. 1.
Figure 4:
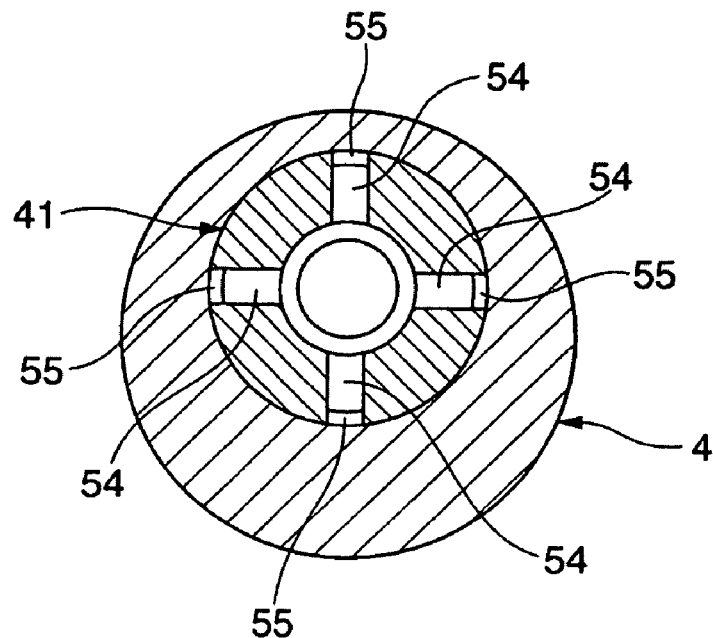
FIG. 4 is a cross sectional view taken along the IV-IV line of FIG. 1.

A plurality of recessed parts 25, which constitutes a rotary operating part, is formed in the opening end surface of the upstream side opening 16a of the upstream side retainer 16. A main body part 16C, which is a portion rearward of the upstream side end part 16B of the upstream side retainer 16, is formed so that it is longer than the upstream side end part 16B. Four upstream side fluid pressure outlet parts 26, which comprise through holes that pass through the inner and outer circumferential surfaces of the upstream side retainer 16, are formed in the junction between the main body part 16C and the upstream side end part 16B at equal intervals in the circumferential directions; furthermore, four first conduits 27 (FIG. 3) are formed at equal intervals in the circumferential directions in the outer circumferential surface on the downstream side of the portion at which the pressure outlet parts 26 are formed. The first conduits 27 comprise grooves formed in the axial directions of the upstream side retainer 16, and the upstream side ends of the first conduits 27 communicate with the upstream side fluid pressure outlet parts 26. Furthermore, an annular groove 28, which communicates with the downstream side ends of the four first conduits 27, is formed in the downstream side end of the outer circumferential surface of the upstream side retainer 16. Furthermore, the upstream side fluid pressure outlet parts 26 of the upstream side retainer 16 have an outer diameter D2 and are provided at positions at which they are spaced apart on the upstream side by a distance L1 (L1>2×D), which is more than twice as long as the inner diameter D of the opening end surface of the upstream side opening 16a.

Furthermore, a second conduit 29 formed in the valve body 4 connects the first conduits 27 to a differential pressure sensor 31, which serves as a means of detecting differential pressure, via the annular groove 28. The second conduit 29 comprises a through hole formed in the radial directions so that it brings the interior and the exterior of the wall thickness of the valve body 4 into communication. Consequently, a fluid pressure P1 inside the upstream side pipeline 3A is guided to the differential pressure sensor 31 through the upstream side fluid pressure outlet parts 26, the first conduits 27, the annular groove 28, and the second conduit 29, in that order.

The differential pressure sensor 31 detects the differential pressure ΔP (=P1−P2) between the fluid pressure P1 inside the upstream side pipeline 3A of the valve body 4 and a fluid pressure P2 inside a downstream side pipeline 3B and is fixed to the surface of the valve body 4 on the outer circumferential surface side at a position corresponding substantially with the valve element 6.

Provided and disposed on the downstream side of the valve element 6 inside the valve body 4 are a downstream side seat ring 40, which tightly contacts the seat part 12 of the valve element 6; a downstream side retainer 41, which holds the downstream side seat ring 40 so that it is freely movable in the axial directions; a spring 42, which serves as an elastic member that urges the downstream side seat ring 40 toward the upstream side and presses it against the seat part 12 of the valve element 6; and an O-ring 43, which seals the downstream side seat ring 40 to the downstream side retainer 41; together these elements constitute a seal structure of a downstream side seat ring part.

The downstream side seat ring 40 opposes the upstream side seat ring 15 with the valve element 6 interposed therebetween, and, together with the upstream side seat ring 15, pinches the valve element 6 so that it is pivotable. A center hole 40a of the downstream side seat ring 40 and a center hole 41a of the downstream side retainer 41 form a downstream side passageway 3B of the passageway 3. Furthermore, the downstream side seat ring 40 is formed in a shape identical to that of the upstream side seat ring 15.

The downstream side retainer 41 differs from the upstream side retainer 16 in that it is formed at a sufficiently greater length than the upstream side retainer 16 is, but is otherwise completely the same. Namely, the length of the downstream side retainer 41 is three to four times that of the upstream side retainer 16, and the downstream side seat ring 40 is housed inside the upstream side opening via the spring 42 and the O-ring 43 so that it is freely movable in the axial directions. An annular shaped housing part 50, which houses the spring 42, is formed between the inner circumferential surface of the downstream side retainer 41 and the outer circumferential surface of the downstream side seat ring 40. Furthermore, an annular shaped groove 51, to which the O-ring 43 is fitted, is formed in the inner circumferential surface of the downstream side retainer 41.

Figure 5:
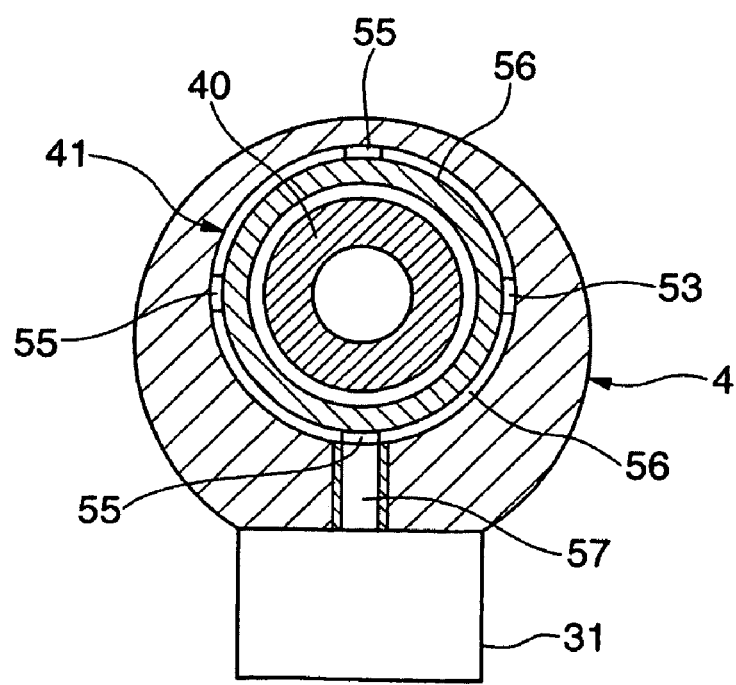
FIG. 5 is a cross sectional view taken along the V-V line of FIG. 1.

At the rear end of the downstream side retainer 41, the formation of a male thread 45 forms a male thread part 41A, which is screwed into a female thread 46 formed in the inner circumferential surface of the downstream side opening of the valve body 4. A plurality of recessed parts 53, which constitutes the rotary operating part, is formed in the surface of the male thread part 41A. The portion frontward of the male thread part 41A of the downstream side retainer 41 forms a main body part 41B, and four downstream side fluid pressure outlet parts 54, which comprise through holes, are formed in the radial directions at equal intervals in the circumferential directions in the boundary part between the main body part 41B and the male thread part 41A and between the inner and outer circumferential surfaces of the downstream side retainer 41 so that they pass therethrough; furthermore, four third conduits 55 (FIG. 5) are formed at equal intervals in the circumferential directions in the outer circumferential surface on the upstream side of the portion at which the pressure outlet parts 54 are formed. The third conduits 55 comprise grooves formed in the downstream side retainer 41 in the axial directions, and the downstream side ends of the third conduits 55 communicate with the downstream side fluid pressure outlet parts 54. Moreover, an annular groove 56, which communicates with the upstream side ends of the four third conduits 55, is formed in the outer circumferential surface of the downstream side retainer 41 on the upstream side end. Furthermore, an inner diameter D3 of a downstream side opening 41b of the downstream side retainer 41 is larger than the inner diameter (D1) of the center hole 40a of the downstream side seat ring 40; furthermore, the downstream side fluid pressure outlet parts 54 have an outer diameter D4 and are provided at positions at which they are sufficiently spaced apart from the valve element 6 by a distance L2 (L2>6×D3) on the downstream side that is six times greater than the inner diameter D3 of the opening end surface of the downstream side opening 41b of the downstream side retainer 41. Furthermore, the inner diameter D3 of the downstream side opening end surface of the downstream side pipeline 3B is set so that it is the same as the inner diameter D of the opening end surface of the upstream side opening 16a (D3=D).

Furthermore, a fourth conduit 57 formed in the valve body 4 connects the third conduits 55 to a differential pressure sensor 31 via the annular groove 56. The fourth conduit 57 comprises a through hole formed in the radial directions so that it brings the interior and the exterior of the wall thickness of the valve body 4 into communication. Consequently, a fluid pressure P2 inside the downstream side pipeline 3B of the valve body 4 is guided to the differential pressure sensor 31 via the downstream side fluid pressure outlet parts 54, the third conduits 55, the annular groove 56, and the fourth conduit 57, in that order.

The flow control valve 1 further comprises a valve opening degree detecting means 60, which comprises a potentiometer that detects the valve opening degree of the valve element 6, and a flow rate calculating means 61 that calculates the flow rate of the fluid 2 that flows inside the valve body 4; in addition, the differential pressure sensor 31 and the valve opening degree detecting means 60 are connected to the flow rate calculating means 61 by signal lines 62, 63.

Given that the flow control valve 1 is structured as described above, if the valve element 6 is pivoted and thereby switched from the fully closed state to the fully open state shown in FIG. 1, then the fluid 2 that is supplied from the upstream side piping to the flow control valve 1 via piping flows to the downstream side piping through the upstream side pipeline 3A (namely, the center holes of the upstream side retainer 16 and the seat ring 15), the through passageway 9 of the valve element 6, and the downstream side pipeline 3B (namely, the center hole 40a of the downstream side seat ring 40 and the center hole 41a of the downstream side retainer 41), in that order. At this time, the upstream side pressure P1 of the fluid 2 that flows inside the valve body 4 is conducted to the differential pressure sensor 31 via the upstream side pressure outlet parts 26, the first conduits 27, the annular groove 28, and the second conduit 29, in that order. In addition, the downstream side pressure P2 of the fluid 2 that flows inside the valve body 4 is conducted to the differential pressure sensor 31 via the downstream side pressure outlet parts 54, the third conduits 55, the annular groove 56, and the fourth conduit 57, in that order. Once the upstream side pressure P1 and the downstream side pressure P2 have been conducted to the differential pressure sensor 31, the differential pressure $\Delta P$ (=P1−P2) thereof is detected and that measurement value is sent to the flow rate calculating means 61.

In addition, the valve opening degree detecting means 60 detects the pivoting angle of the valve stem 7 of the valve element 6 and sends that measurement value to the flow rate calculating means 61. The flow rate calculating means 61 derives a flow coefficient (Cv value) based on the measurement value of the differential pressure sensor 31 and the measurement value of the valve opening degree detecting means 60, and calculates a flow rate Q of the fluid 2 that flows inside the valve body 4 by plugging the measurement values and the flow coefficient into the abovementioned equation (1).

Thus, in the present invention, the first and second conduits 27, 29, which connect the upstream side pressure outlet parts 26 and the differential pressure sensor 31 of the flow control valve 1, are formed in the upstream side retainer 16 and the valve body 4, and the third and fourth conduits 55, 57, which connect the downstream side pressure outlet part 54 and the differential pressure sensor 31, are formed in the downstream side retainer 41 and the valve body 4; therefore, there is no need to provide and attach passageway piping to the outer side of the valve body 4, which makes it possible to make the flow control valve 1 more compact. In addition, the first and third conduits 27, 55 use the space between the inner circumferential surface of the valve body 4 and the outer circumferential surfaces of the downstream side retainers 16, 41, which makes both incorporating separate members inside the valve body 4 unnecessary and decreasing the number of parts and the assembly labor possible.

Furthermore, the upstream side fluid pressure outlet parts 26 are provided at positions at which they are sufficiently spaced apart (by a distance of L1) from the valve element 6 on the upstream side; the downstream side pressure outlet parts 54 are provided at positions at which they are sufficiently spaced apart (by a distance of L2) from the valve element 6 on the downstream side; the downstream side ends of the four first conduits 27 mutually communicate via the annular groove 28; and the upstream side ends of the four third conduits 55 likewise mutually communicate via the annular groove 56; therefore, the effects of turbulent flow are small, which makes it possible to detect the upstream side pressure and the downstream side pressure of the fluid 2 in the vicinity of the fluid pressure outlet parts 26, 54 on the upstream and downstream sides with high accuracy, to measure the flow rate with high accuracy, and thereby to improve the measurement accuracy and reliability of the flow control valve 1.

Furthermore, the abovementioned embodiment of the present invention provides an example wherein the first and third conduits 27, 55 and the annular grooves 28, 56 are formed in the outer circumferential surfaces of the retainers 16, 41 on the upstream side and the downstream side, respectively; however, they may instead be formed in the inner circumferential surface of the valve body 4 on the upstream and downstream sides.

In addition, the embodiment of the present invention provides an example wherein the flow control valve is adapted to a floating type two-way ball valve, but the present invention may also be adapted to a trunnion type two-way ball valve. In that case, while the downstream side seat ring 40 and the downstream side retainer 41 that are provided to a floating type two-way ball valve would not necessarily be needed, all other members would be utilized. Alternatively, the present invention may be configured so that only the downstream side seat ring 40 is eliminated.

Thus, those skilled in the art will readily recognize numerous adaptations and modifications, which can be made to the present invention which fall within the scope of the present invention as defined in the claims. Moreover, it is intended that the scope of the present invention include all foreseeable equivalents to the elements and structures as described with reference to FIGS. 1-5. Accordingly, the invention is to be limited only by the scope of the claims and their equivalents.

The invention claimed is:

1. A flow control valve, comprising:
   a valve element that is pivotally disposed inside a valve body and configured to regulate the flow rate of a fluid that passes through the interior of the valve body;
   an upstream side seat ring that contacts under pressure a seat part of the valve element;
   an upstream side retainer that holds the upstream side seat ring;
   a valve opening degree detector that is configured to detect a valve opening degree of the valve element;
   a differential pressure detector that is configured to detect a differential pressure between the fluid pressure inside an upstream side pipeline and the fluid pressure inside a downstream side pipeline of the valve body; and
   a flow rate calculator that is configured to calculate a flow coefficient based on a first measurement value provided by the differential pressure detector and a second measurement value provided by the valve opening degree detector, and is further configured to calculate the flow rate of the fluid based on the measurement values and the flow coefficient;
   wherein,
   the differential pressure detector is attached to an outer circumferential surface of the valve body;
   an upstream side fluid pressure outlet part is provided between an inner circumferential surface and an outer circumferential surface of the upstream side retainer in the vicinity of an upstream side end part so that it passes therethrough;
   a first conduit has an upstream side end in communication with the upstream side fluid pressure outlet part, the first conduit being formed between an inner circumferential surface of the valve body and the outer circumferential surface of the upstream side retainer; and
   a second conduit formed in the valve body connects a downstream side end of the first conduit to the differential pressure detector.

2. A flow control valve according to claim 1, further comprising:
   a downstream side seat ring that contacts under pressure said seat part of the valve element; and
   a downstream side retainer that holds the downstream side seat ring;
   wherein,
   a downstream side fluid pressure outlet part is provided between an inner circumferential surface and an outer circumferential surface of the downstream side retainer in the vicinity of a downstream side end part so that it passes therethrough;
   a third conduit has a downstream side end in communication with the downstream side fluid pressure outlet part, the third conduit being formed between the inner circumferential surface of the valve body and the outer circumferential surface of the downstream side retainer; and
   a fourth conduit formed in the valve body connects an upstream side end of the third conduit and the differential pressure detecting means.

* * * * *